Figure 1:
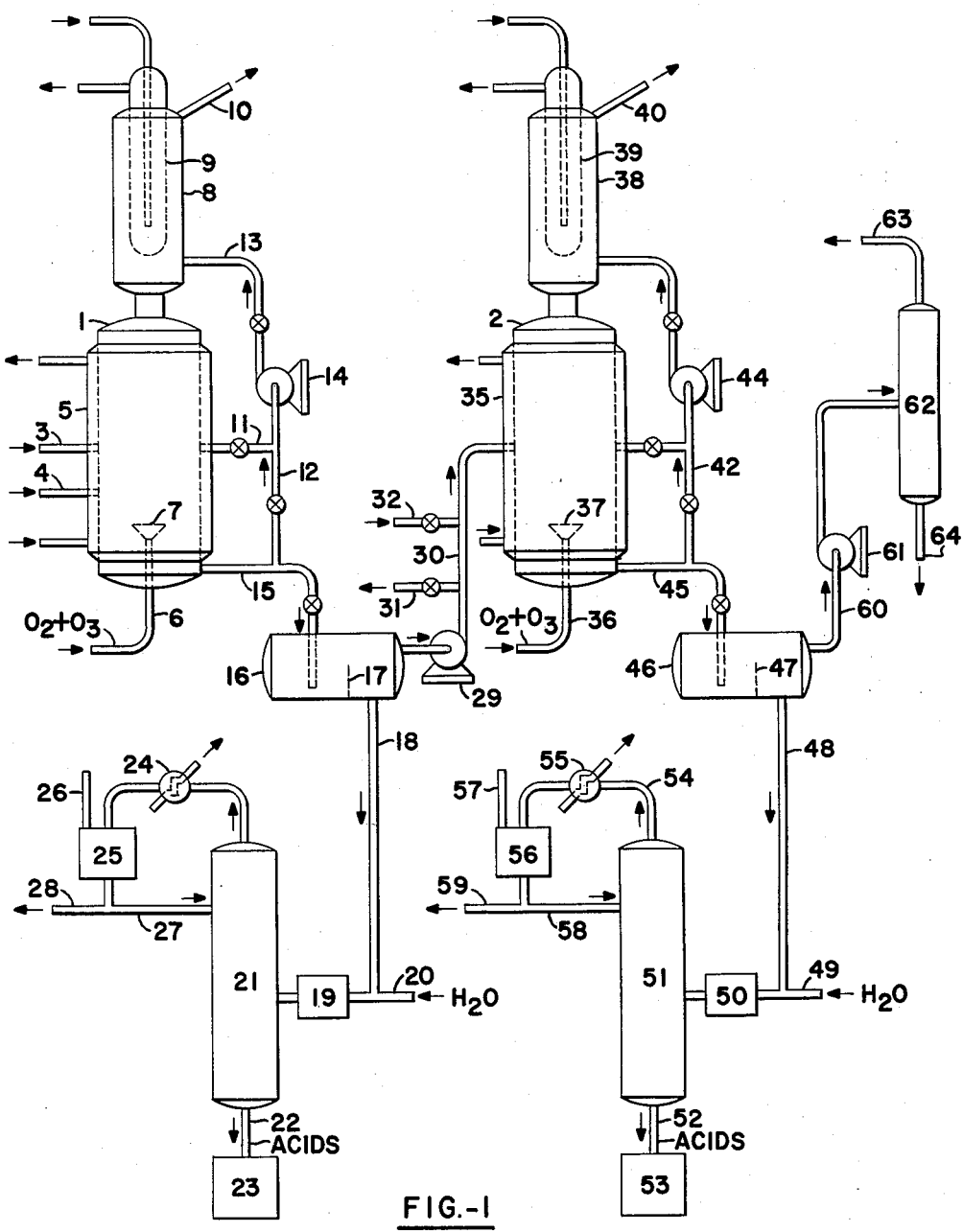

United States Patent Office 2,955,123
Patented Oct. 4, 1960

2,955,123

SELECTIVE OZONE OXIDATION OF HYDROCARBONS

Dimitrios V. Favis, Sarnia, Ontario, Canada, assignor to Esso Research and Engineering Company, a corporation of Delaware Filed July 13, 1956, Ser. No. 597,644

6 Claims. (Cl. 260—413)

This invention deals with the use of ozone-containing gas for selectively oxidizing hydrocarbons and their oxygenated derivatives suspended in a more volatile acid organic liquid which benefits the desired reactions and aids in recovery of the desired products.

The ozone oxidizing reaction can be controlled for a pretreatment of hydrocarbon mixtures to effect a separation of more readily reacted components such as aromatic hydrocarbons, unsaturated hydrocarbons, also, sulfur, nitrogen-containing components and other components sensitive to oxidation with ozone, after which the hydrocarbons can be converted by oxidation to desired high molecular weight of carboxylic acids.

In oxidizing saturated hydrocarbons, acyclic and cyclic, temperatures of the order of 100° to 140° F. and higher, e.g. about 150° F., for normally solid hydrocarbons are preferably used in passing a stream of the ozone-containing gas into the suspension of hydrocarbon contained in a major proportion of the liquid organic acid solvent for the product which resists oxidation, e.g. glacial acetic acid. The acid solvent medium used should benefit the operation in several respects:

(a) Increasing absorbability of the ozone by the hydrocarbon undergoing oxidation.

(b) Preventing explosion of various peroxide type compounds, including ozonides.

(c) Providing a medium for separating the oxidized from unoxidized material during the reaction.

When used for a pretreatment of mixtures containing saturated or unsaturated hydrocarbons, the ozonization can be controlled by limiting the temperature and time of reaction to accomplish a far reaching removal of the aromatic and unsaturated hydrocarbons by oxidation, leaving the paraffinic naphthenic hydrocarbons largely unreacted. In this same preliminary treatment, the sulfur- and nitrogen-containing impurities are removed. Thus, the pretreatment can be used on wax distillate or lubricating oil distillates to obtain more paraffinicity.

The paraffin waxes separated from petroleum oils or a wax of synthetic origin, including polyethylene or other polymers of the same type, can be oxidized by the ozone treatment to form a mixture of organic acids which may be predominantly monocarboxylic and of a predetermined molecular weight. These acid products can be made to contain a limited amount of hydroxyl and carbonyl functions. With the controls of the ozone treatment, excessive degradation to low molecular weight oxygen-containing compounds can be prevented.

The use of ozone for oxidizing various hydrocarbons is not new. It has been used with certain solvents. Hitherto the commercial development of ozone oxidation has had a number of technical drawbacks. Ozone tends to react very rapidly with all types of hydrocarbons at elevated temperatures, but it has now been found that there are steps which can be taken to moderate the reaction of ozone in order to avoid forming undesired mixtures of oxygenated materials and avoid undesirable side reaction.

Techniques which were developed for moderating the ozone treatment and which led to the discoveries of the present invention will be described with reference to the schematic flow plan of means used in ozonizing and separating the products.

The effect of the solvent medium in the ozone treatment is very important. Some hydrocarbons, e.g. liquid aromatics, can be oxidized with ozone in the absence of a solvent but even in these reactions there is a great danger of explosive mixtures. Thus, the ozone reaction should be carried out using a liquid medium inert to ozone. The liquid medium should be unreactive per se, e.g. unreactive with the reactants as well as unreactive with products of the reaction. For example, in carbon tetrachloride the primary oxidation products, including ozonides and other peroxide type compounds formed will tend to associate and form polymeric derivatives. However, in polar organic compounds, such as $C_1$, $C_2$, $C_3$ and other fatty acids and such compounds having carboxylic or anhydride groups, association does not readily take place and the monomeric products of oxidation are obtained principally. Unstable peroxide type compounds, including ozonides, which are present in the acid can be readily decomposed by the addition of water before the acid used as a diluent is removed from the reaction products by distillation.

It was observed in testing various polar organic liquids which perform their functions properly in the ozone treatment, that these liquids speed with the reaction of the ozonization and permit the reaction to go forward to quantitative completion. This effect is unusual and distinctive from the usual oxidation reactions performed in a liquid medium with a certain amount of catalyst that reach an equilibrium or point where the desired products are formed in low conversion yields.

A procedure used for investigating and discovering in the ozonization treatment involves suspending the hydrocarbon oil or wax in from about 0.5 to 2 volumes of glacial acetic acid or the like and passing distributed streams of oxygen or air containing ozone up through the suspension with means for refluxing vaporized acetic acid. When certain desired amounts of ozone were absorbed, the treated reaction mixture or portions thereof were settled into two layers for separation. The upper layer consisted of unoxidized hydrocarbons and the lower layer consisted of a solution of the oxidized hydrocarbons in the acetic acid. After separation the acetic acid phase was hydrolyzed with about 30 volume percent water. The high molecular weight oxygenated compounds were recovered by distilling therefrom water and acetic acid. The upper hydrocarbon layer, termed raffinate or ozone treated oil was stripped of small amounts of acetic acid and other volatiles under vacuum or with the use of an inert gaseous stripping agent.

The type of reaction apparatus used is illustrated in Fig. 1. The reactors 1 and 2 are shown to be in series. A single reactor may be used for a batch or continuous operation or any number of reactors may be used in series for staged operation. The initial liquid hydrocarbon feed and the acid medium are introduced into the first reactor 1 through inlets 3 and 4. The reactor may be provided with a cooling jacket 5 or other heat exchange cooling means. The ozone-containing gas is introduced from line 6 through a fritted glass disperser 7 or other efficient dispersing means near the bottom of the reaction zone in the reactor vessel 1. Connected to the tube of vessel 1 is a reflux means 8 provided with a heat exchange cooler 9 in which a cooling liquid is circulated. Uncondensed gases are taken overhead from reflux means through outlet 10. An external pump around circuit include valve pipes 11, 12 and 13 with pump 14 may be provided for our mixing, cooling and contacting. The reaction mixture after a desired amount of ozone absorption is withdrawn through valve line 15 to the settling tank 16 in which a baffle means 17 is indicated for aiding settling. The settled lower acid layer is withdrawn from the settler 16 through line 18 to be subjected to hydrolysis in mixture 19 with water introduced from line 20. The hydrolyzed mixture is passed into stripping column 21 for distilling overhead volatile low molecular weight acid and water leaving the high molecular weight acid products to be withdrawn as bottoms through line 22 to storage and/or finishing 23. The overhead volatile acids in water from stripping tower 21 are cooled and partially condensed in cooling means 24, then passed into the receiver 25 which has a gas vent 26 through which vacuum can be supplied. Part of the condensed acid may be refluxed through line 27 and the remaining portion of the low molecular weight distillate can be recovered through line 28, then reused.

The upper layer of raffinate oil is withdrawn from the settler 16 by pump 29 and is passed through line 30 to the next reactor 2, otherwise is withdrawn to a treating unit through line 31. Fresh feed materials, e.g. oil and acid can be introduced to line 30 through line 32.

Reactor 2 may be constructed similar to reactor 1 with a cooling jacket 35, ozone containing gas inlet 36, gas disperser 37, upper reflux means 38, reflux cooler 39, uncondensed vapor and gas outlet 40, pump around circuit 42, pump 44, reaction product of withdrawal line 45.

The reaction product withdrawn from reactor 2 may be settled in settler 46 provided with baffle 47 and an acid layer withdrawal line 48.

The separated acid layer from settler 46 is mixed with water from line 49 in mixing means 50, then is subjected to stripping in stripping column 51. Stripping column 51 has a bottoms withdrawal line 52 which passes the desired acid products to storage and finishing equipment 53. The distilled volatile acids are taken overhead with water through line 54, condenser 55 to receiver 56 which has a gas vent line 57, reflux line 58 and overhead product recovery line 59.

The raffinate oil withdrawn from the upper layer in settler 46 through line 60 is passed by pump 61 to storage or to a vacuum fractionating column 62 in which the oil is freed of volatile materials, such as acids taken overhead through line 63. The oil product is withdrawn through line 64.

The ozonizer equipment used was capable of producing approximately 2.7 weight percent of ozone mixture with oxygen. The proportion of ozone may be varied but it appeared desirable to have the ozone diluted with oxygen or also with relative inert gases.

Ozone is a far more active oxidizing agent than oxygen. To use oxygen for obtaining similar rates of reaction it is necessary to use substantially higher temperatures and catalysts, such as oxidizing salts. For example, in using oxygen or low melting point microcrystalline wax 1% manganese stearate was added to the wax. In the treatment with oxygen, 300° F. was used whereas in the treatment with ozone 124° F. was used to obtain similar equipment rates of reaction amounting to about 37 grams absorption of oxygen per liter of wax per hour. In the treatment with ozone containing oxygen a constant rate of absorption was obtained up to past 70 g./liter/hr., whereas the absorption rate in the treatment with oxygen only leveled off and did not increase. These experiments indicated that the catalytic treatment with oxygen was autoretardant. There was no evidence of this in the treatment with ozone using sufficient amount of the liquid acid medium. The increased amount of total oxidation during the ozone treatment as plotted against time shows that the oxonization was autocatalytic. This was true with regard to the amount of saponifiable oxygenated wax formed. Measurements were made of the amounts of carbon dioxide and formic acid evolved during the reactions. These measurements show that with the ozonization the rate of degradation was very constant over a 10 hour period and showed only a carbon loss of 0.8% based on the feed wax over a reaction period of 7 hours.

As already indicated, the presence of a low molecular weight polar organic liquid as a reaction medium is desirable for several reasons. Such liquid mediums used in ozone treatments is known and their use per se is not claimed herein, but rather the manner in which they are used. Glacial acetic acid is outstanding as a liquid medium for the reaction but other similar acting low molecular weight carboxylic acids may be used alone or in mixture with other solvents. Other low molecular weight polar organic liquids which may be used briefly in a mixture with the organic acids are halogenated hydrocarbons such as chloroform, etc. The liquid reaction medium should be relatively inert in the reaction and in the recovery of the ozonized products. The liquid medium should speed up the absorption of ozone by the hydrocarbons, prevent explosion of oxygen-containing compounds, and provide a preferential extractive solvent action on the oxidized hydrocarbons for separating them from the unoxidized hydrocarbons.

Any proportion of acetic acid or liquid medium to hydrocarbons suspended therein is permissible, provided that it assures a two phase liquid system. This proportion depends on the partial solubility of the hydrocarbons in acetic acid or liquid medium and vice versa.

A liquid medium, such as acetic acid, has been observed to aid in giving complete ozone absorption with an entry rate of 31.7 g./liter of hydrocarbon/hr. with 2 parts of the acetic acid per part of the hydrocarbon by volume. However, in the absence of the acetic acid medium and even using a lower ozone entry rate of 10 g./liter of hydrocarbon/hr. the ozone absorption was only 60% at the end of 5 hours.

Reaction temperatures within the range of a few degrees above freezing point and below the flash point of the system under ozonization is permissible. It has been found that preferable ranges are those between room temperature and a few degrees above the melting point of the hydrocarbon under ozonization.

Pressures above or below the atmospheric are suitable. Atmospheric pressure is preferable.

Any ozone rate of charge is permissible.

The presence or absence of water in the reacting system influences the physical and chemical properties of the end products. The effect of water is determined experimentally.

The addition of water in the distillation of the acetic acid phase is preferable, although not necessary, since it assists the hydrolysis of the oxidized material.

In addition to the method of alkali treating, the acids from the ozonization of waxes and lube oils can be separated by steam distillation or other conventional methods.

The ozonization of petroleum hydrocarbons in the presence of mediums other than acetic acid have been explored. These are acetic anhydride, chloroform, carbon tetrachloride, water, etc. Solvents or mixtures of solvents, at least one component of which contains acidic or anhydride groups and possesses the ability to resist oxidation with ozone are permissible in carrying out ozonization reactions. In order to assure a two phase liquid system, the partial solubility of the solvent into the hydrocarbon and vice versa must be small.

In accordance with one object of the present invention, a relatively crude mixture of hydrocarbon, such as a wax distillate or petroleum fraction containing some aromatics or unsaturates with saturated hydrocarbons and also containing sulfur impurities may be pretreated in the liquid polar solvent for the oxygenated hydrocarbons with ozone at suitable low reaction temperatures usually in the range of ordinary room temperature, e.g. about 70° to 100° F., for preferential removal of the aromatics, unsaturates and sulfur. Such an operation, for example, would be carried out in reactor 1, so that the unoxidized raffinate oil withdrawn from the settler 16 by pump 29 could be passed into a subsequent reactor 2 for oxidation to form the desired monocarboxylic acids from the saturated hydrocarbons.

To determine the effect of the polar solvent reaction medium a series of treats were made on paraffin oil distillates without any of the solvent present and with varying amounts of solvent present.

In one series of tests samples of the same oil distillate were treated to the same raffinate oil yield of 76%. The products obtained in the absence of the solvent medium were extracted after the ozone treatment with the solvent to obtain a separation. The raffinate oils were then analyzed for physical and chemical changes. The raffinate oil produced in the presence of the solvent, acetic acid, showed much better color, higher gravity, higher aniline point and far greater sulfur removal. Inspections on two of the raffinate oils produced with adequate acetic acid present and produced without acetic acid present during the reaction are shown in the following table:

TABLE I

*Effect of polar solvent in ozone reaction*

|  | Feed | A | B |
| --- | --- | --- | --- |
| Ozonization Conditions: |  |  |  |
| Acetic Acid Ratio to Oil |  | 1.5 | None |
| Ozone Change Rate g./l/hr |  | 2.3 | 9.9 |
| Inspections: |  |  |  |
| Raffinate Yield, Vol. percent | 100 | 76.0 | 76.6 |
| Viscosity Index | 58.0 | 76.6 | 76.3 |
| Color (Robinson) | 1.0 | 12.0 | 2.5 |
| Aniline point, °F | 181.5 | 206.8 | 194.5 |
| Gravity, °A.P.I | 24.8 | 29.1 | 26.1 |
| Sulfur, percent | 0.50 | 0.09 | 0.233 |

Similar tests show that almost a complete removal of nitrogen and sulfur compounds is obtained with the raffinate yields in the range of 70 to 90% and that the aromatic content is substantially reduced. The removal of the nitrogen and sulfur impurities is sufficiently faster than the reaction of the aromatics so that the ozonization operation can be applied to remove the nitrogen and sulfur impurities to substantial extent from aromatic hydrocarbons with only a small portion of the aromatics being reacted in carrying out the treatment with ozone at low temperatures in the range of 70° to 100° F. Many tests were carried out to investigate the effects of various pressure variables on the ozone absorption rates and changes in the composition of the raffinate oil.

The operative and preferred conditions are summarized as follows:

TABLE II

| Operating Conditions | Preferred Conditions |
| --- | --- |
| Temperature Freezing-Flash Point of the hydrocarbon-acid system. Acid-Oil Ratio: Any ratio assuring a two liquid phase system. Stages: One and more. Ozone charge rate: Any rate is operative. | Depend on the desired physical and chemical properties of the end products. |

The test shows that higher acetic acid ratios starting at ½ volume acid to 1 volume of oil by increasing the amount of acid to oil more complete absorption was obtainable and with more elevated temperatures ranging upwardly above 67° F. there were higher rates of absorption.

The following processing data illustrates the effects of the ozonization on sulfur impurities, saturated hydrocarbons and aromatics in the raffinate of a treated oil with the treatment carried out in two stages:

TABLE III

*Ozone-oxygen at 124° F. acetic acid in oil ratio of 2:1*

| Inspection | Feed | One Stage Raffinate | Stage Two |
| --- | --- | --- | --- |
| Viscosity Index | 58.0 | 87.3 | 95.7 |
| Sulfur, percent | 0.5 | 0.12 | 0.05 |
| Saturate, Wt. percent | 56 | 76 | 81 |
| Aromatic, Wt. percent | 44 | 20 | 14 |

The results from a series of tests showed that the greatest sulfur removal was obtained with increased ratio of the solvent acid to the oil at low ozone rates and with increased time or with increased stages. In the analysis some of the oxidized hydrocarbons were left in the raffinate which was analyzed. A low ozone rate is of the order of 15 to 30 g./liter of oil/hr. High rates are of the order of 75 g./liter or oil/hr.

The raffinate obtained by ozone treatments which were controlled particularly for removal of sulfur and nitrogen impurities with relatively low removal of aromatics and with substantial removal of aromatics were subjected to hydrogenation with an active hydrogenation catalyst, e.g. platinum and nickel. It was found practical to hydrogenate these oils of very low sulfur content with a highly active catalyst which is susceptible to poisoning by sulfur. A raffinate oil which had been desulfurized by ozonization was hydrogenated for 5 to 10 hours in a pump at 800 p.s.i. and 500° F. in the presence of a nickel catalyst. This treatment has been shown to be equivalent to a continuous operation in which the oil is fed at 1 to 2 volumes per volume of catalyst per hour. The hydrogenated oil products produced were found to be water white and had a high viscosity index of the order of 97 or 98. These oils showed excellent stability, making them very suitable as turbine oils. Similar hydrogenation refining treatments were made with other hydrogenation catalysts, e.g. cobalt molybdate catalysts. The hydrogenation could be carried out to reduce the amount of aromatics to a negligible amount, for example, 5% or less.

In addition to the use of the ozone treatment for refining the hydrocarbon mixtures, for selectively separating aromatics and unsaturates from saturated hydrocarbons, the ozone treatment has great advantages in producing oxidation products of value. In the separation of oxidized aromatics aromatic acid can be recovered from the acetic acid extract which is withdrawn from the ozonization zone.

If the feed stock is paraffinic or is treated to be made paraffinic, the oxidized fraction which can be recovered will contain certain fatty acids of value. Similarly, if the feed stock is naphthenic in nature, naphthenic acids can be produced. Thus, it is possible to carry out the ozone treatment in one or more stages depending on the initial feed stock to arrive at a number of useful products. Some of the organic acids formed can be esterified with an alcohol to prepare synthetic lubricating oils. Accordingly, in the refining there is not necessarily a loss of materials removed from the raffinate.

The manner in which aliphatic fatty acids are prepared by the ozone treatment will be illustrated by the following example.

EXAMPLE 1

Figure 2:
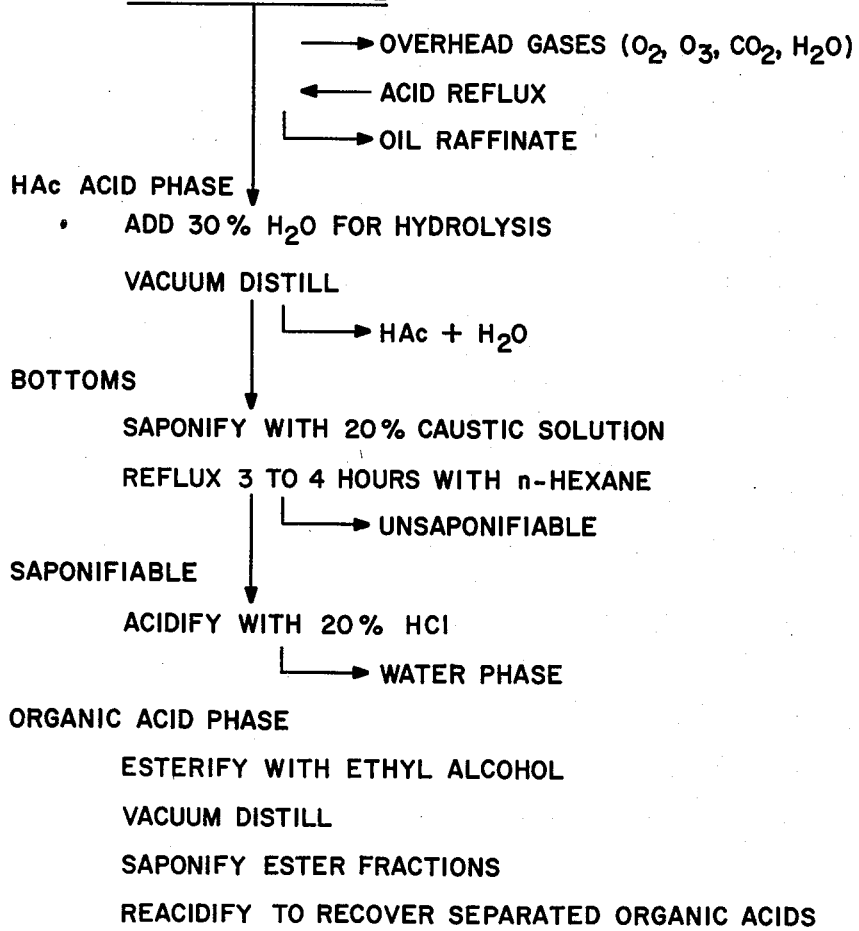

A crude oxidation product for fatty acid production was prepared by ozone treatment of a 125° F. melting point paraffin wax in the presence of two volumes of liquid acetic acid at 130° F. The oxidation was carried out purposely at a slow rate with ozone in oxygen in three stages of 24 hours each using a total of 50 grams of ozone charged per pound of wax in each stage. The acetic acid phase was removed and replaced with fresh acid at the end of each stage and the unoxidized wax of each stage was separated as an upper raffinate oil, then passed to the succeeding stage. The various steps used to recover the acetic products from the ozone treatment are outlined in Fig. 2 of the drawing. With the operations used for partial conversion, 53% of the wax was converted to organic acids which were water insoluble. By using further stages or by continuous recycling additional conversion is to be obtained.

The organic acids which were recovered from the saponifiable bottoms following hydrolysis and distillation of the acetic acid with water were subjected to esterification with ethyl alcohol and then carefully fractionated in a 15 plate column at a 5:1 reflux ratio. The acids were then recovered by saponifying the esters in each distillate fraction and acidifying the separated fractions. Properties of the acid fractions thus separated were found to compare to corresponding fatty acids in carbon, hydrogen and oxygen contents. These comparisons were made with known values of pure fatty acids as shown in Table IV. It was found that the excess oxygen was present in the acids to some extent to carbonyl and hydroxyl groups, but these functional groups and any unsaturation could be removed by a mild hydrogenation.

From distillation characteristics of the fatty acids, it could be observed that low molecular weight fatty acid product was due to oxidative fission in towards the center of the wax molecule and the lowest molecular weight acids were formed by additional degradation. For example, with a wax in which the average number of carbon atoms was 25 the average for the distillation was 16 carbon atoms per molecule.

From studies of products obtained and the possible reactions it was observed that the oxidation of wax or paraffinic molecules can proceed through the formation of alcohols, peroxides and carbonyl compounds to undesired unsaponifiable matter. On the other hand, the oxidation when carried out properly with ozone can be made to produce the aliphatic carboxylic acids and may also be made to prepare such acids with hydroxy groups which are quite valuable since the hydroxy groups can be converted to carboxyl groups, and thus provide valuable bifunctional compounds.

In treating the suspension of microcrystalline wax at 140° F. with ozone and a reaction temperature of 140° F. samples of the reaction mixture product were analyzed at 33.5% and 45% yields to obtain the following data:

TABLE V

| Overall Yield, Percent | Neut. No. | Sap. No. | Unsaponifiable Percent | Color |
|---|---|---|---|---|
| 33.5 | 300 | 312 | 11.5 | Yellow. |
| 45.0 | 324 | 398 | 12.5 | Light Yellow. |

The increase in neutralization number and saponification number shows the increase of free organic acid formed in the saponifiable oxidation products.

EXAMPLE 3

Paraffin wax of 125° F. melting point was suspended in glacial acetic acid, 2 parts acid per 1 part wax. The suspension was blown with ozone-containing oxygen. After taking the sample at 29.5% yield the products were recycled to the reaction zone and treated to a 47.0% yield. The recycled products became lighter in color, practically white, the unsaponifiable matter increased by about 3% in recycling. The neutralization number was of the order of 230 and the saponification number of the order of 269 at 29.5% yield. The organic carboxylic acid thus formed had an advantage of about 12 to 15 carbon atoms per molecule.

EXAMPLE 4

A naphthenic oil such as obtained by dewaxing and extracting aromatics or in the nature of a medicinal white oil was suspended in glacial acetic acid, 1.5 volumes and 5 volumes of acid per volume of oil. Ozone-containing air was dispersed in the reaction mixture at run temperatures in the range of 60 to 70° F. and at 124° F. to obtain yields of 24, 44, 71, and 94% oxidized product. Neutralization numbers of about 98 to 124 and saponification numbers of about 151 to 172 were obtained on the products, thus indicated to contain carboxylic naphthenic acids.

TABLE IV

*Inspection of organic acid products of ozonization*

| Cut | Percent Distilled | Saponification No. | C Percent | H Percent | O Percent | Compared Fatty Acids | | | | |
|---|---|---|---|---|---|---|---|---|---|---|
| | | | | | | No. of C Atoms | Sap. No. | Percent C | Percent H | Percent O |
| 1 | 7.6 | >500 | 66.1 | 11.4 | 22.5 | 6 | 483 | 62.1 | 10.3 | 27.6 |
| 2 | 8.7 | 314 | 67.5 | 11.4 | 21.1 | 10 | 325 | 69.8 | 11.6 | 18.6 |
| 3 | 9.0 | 296 | 70.0 | 11.5 | 18.5 | 11 | 301 | 71.0 | 11.8 | 17.2 |
| 4 | 8.1 | 264 | 71.5 | 11.8 | 16.7 | 13 | 262 | 72.9 | 12.2 | 15.0 |
| 5 | 8.0 | 254 | 71.5 | 11.6 | 16.9 | 13 | 262 | 72.9 | 12.2 | 15.0 |
| 6 | 6.7 | 223 | 72.6 | 11.9 | 15.5 | 16 | 219 | 75.0 | 12.5 | 12.5 |
| 7 | 6.5 | 227 | 73.5 | 12.0 | 14.5 | 16 | 219 | 75.0 | 12.5 | 12.5 |
| 8 | 6.4 | 204 | 74.2 | 11.9 | 13.9 | 17 | 207 | 75.6 | 12.6 | 11.8 |
| 9 | 6.0 | 218 | 73.5 | 11.6 | 14.9 | 17 | 207 | 75.6 | 12.6 | 11.8 |
| 10 | 5.7 | 199 | 75.2 | 11.9 | 12.9 | 18 | 197 | 76.1 | 12.7 | 11.3 |
| 11 | 5.7 | 182 | 75.0 | 12.1 | 12.9 | 20 | 180 | 76.9 | 12.8 | 10.3 |
| 12 | 5.4 | 164 | 75.4 | 12.1 | 12.5 | 22 | 165 | 77.6 | 12.9 | 9.4 |
| Higher | 16.0 | ¹125 | 75.8 | 11.9 | 12.3 | 30 | 124 | 76.9 | 12.9 | 10.0 |

¹ (Av.).

EXAMPLE 2

Microcrystalline wax of 115° F. melting point was suspended in glacial acetic acid at a ratio of 2 parts acids per one part wax by volume. The liquid suspension of wax droplets was blown oxygen-containing ozone at 124° F. at atmospheric pressure. About every half hour the amount of ozone absorbed was determined and it was found that this amount was a linear function of the reaction time, thus indicating autocatalytic reaction in contrast to a catalytic reaction containing a metal soap at 300° F. in which the amount of oxidation rapidly levels off.

EXAMPLE 5

A number of fractions were obtained from ozonized phenol extract by esterification with amyl alcohol and vacuum fractional distillation. Each fraction had a boiling range of 200° F. The yield in distillable material was 65%. The saponification numbers of the high molecular weight acids were within the range of 79 to 139.

From some experiments it was noted that increasing quantities of ozone are required as the reaction proceeds. This is accounted for by the further reaction of the ozone with compounds which have already been oxidized.

Thus, while no more than 2 moles of ozone should be required theoretically per mole of monocarboxylic acid formed, higher amounts of ozone are consumed in obtaining a maximum yield of oxidation products. For example, about 3.1 moles of ozone would be consumed per mole of carboxylic acid formed provided only oxygen from ozone participates, said acid having a molecular weight of about 225 in the oxidation paraffin wax. Some of the oxygen absorbed will tend to be in the form of hydroxy groups, peroxide groups, ketones, aldehydes and peracids. One way of controlling the ozonization is to carry out the treatment in stages, the unreacted raffinate oil being treated in a separate stage to prevent over oxidation.

It is also desirable to make such provisions for removing oxidized components immediately after they are formed or as they are formed. In removing the oxidized products as they are formed a continuous stream of acetic acid or acid reaction medium which preferentially dissolves the oxidation products can be passed through the reaction zone.

Since in some instances the acid reaction medium may function better in a dry, substantially water-free form, then means for continuously removing water formed by the reaction are desirable. The ozone-containing gas aids in removing water vapor. By use of elevated temperatures and a refluxing means the water vapor can be removed more rapidly while permitting the acetic acid or solvent to be returned to the reaction zone.

The invention described is claimed as follows:

1. A process for separating saturated hydrocarbons from a petroleum lubricating oil distillate fraction comprising said saturated hydrocarbons and unsaturated hydrocarbons, which comprises suspending droplets of said fraction, in amounts proportioned to assure a two-liquid phase system, in a carboxylic acid comprising liquid medium which selectively dissolves partially oxidized hydrocarbons, dispersing ozone-containing gas into the resulting suspension, maintaining said suspension at a temperature in the range of about 70° to 150° F. to effect selective partial oxidation of said unsaturated hydrocarbons thereby forming oxidation products which dissolve in said liquid medium and separating the unreacted saturated hydrocarbons from said liquid medium and said oxidation products dissolved therein, said medium being more volatile than said oxidation products and substantially unreactive with said fraction and said oxidation products throughout said process.

2. A process in accordance with claim 1 wherein droplets of the saturated hydrocarbons separated from said liquid medium and said oxidation products dissolved therein are suspended in glacial acetic acid in amounts proportioned to assure a two-liquid phase system and reacted with ozone at temperatures in the range of 70° to 150° F. to form carboxylic acid derivatives of said saturated hydrocarbons which become dissolved in said glacial acetic acid, and recovering a solution of said carboxylic acid derivatives.

3. A process for separating saturated hydrocarbons from a petroleum lubricating oil distillate fraction containing said saturated hydrocarbons, unsaturated aliphatic hydrocarbon components, aromatic hydrocarbon components, sulfur-containing components, and nitrogen-containing components, which comprises suspending droplets of said fraction, in amounts proportioned to assure a two-liquid phase system, in a carboxylic acid comprising medium which selectively dissolves partially oxidized product of said components, dispersing ozone-containing gas into the resulting suspension, maintaining said suspension at a temperature in the range of about 70° to 150° F. until said components are partially oxidized, thereby forming oxidation products which dissolve in said liquid medium and separating the unreacted saturated hydrocarbons from said liquid medium and said oxidation products dissolved therein, said medium being more volatile than said oxidation products and substantially unreactive with said fraction and said oxidation products throughout said process.

4. A process for partially oxidizing saturated hydrocarbons in a petroleum wax and lubricating oil distillate boiling range which comprises suspending said hydrocarbons as undissolved liquid droplets in glacial acetic acid to form a two-liquid phase reaction mixture, dispersing ozone with oxygen gas into said mixture, maintaining said reaction mixture at 70° to 150° F. until a substantial amount of the suspended hydrocarbons reacts with said ozone to form aliphatic carboxylic acids which become dissolved in said acetic acid and a substantial amount of said suspended hydrocarbons remains unreacted, and separating the acetic acid containing dissolved oxidized hydrocarbons from the remaining undissolved and unreacted hydrocarbons.

5. An apparatus for oxidizing petroleum hydrocarbon fractions and their components selectively by ozone-containing gas and a carboxylic acid comprising liquid medium that selectively dissolves partially oxidized product and is more volatile than the components of said fractions, which comprises a first reaction vessel encompassing a first reaction zone, at least one inlet conduit communicating with said first reaction zone for conducting said liquid medium, said petroleum fractions, and said ozone-containing gas to said reaction zone, mixing means associated with said first reaction zone for dispersing said ozone-containing gas into a liquid suspension of said fractions in said liquid medium, at least one exit conduit communicating with said first reaction zone for removing gases and vapors from said first reaction zone, settling means for separating a lighter liquid from a heavier liquid, at least one conduit communicating with said first reaction zone and said settling means for withdrawing said liquid medium with unreacted hydrocarbon components suspended therein and reaction products dissolved therein from said first reaction zone to said settling means, at least one conduit communicating with a lower portion of said settling means for withdrawing a heavier lower liquid layer containing dissolved oxidation products from said settling means, a second reaction vessel encompassing a second reaction zone, at least one conduit communicating with an upper portion of said settling means and said second reaction zone for withdrawing a lighter upper oil layer from said settling means and conducting said layer to said second reaction zone, at least one conduit in communication with said second reaction zone for conducting a fresh charge of said liquid medium and a fresh charge of said ozone-containing gas to said second reaction zone, mixing means associated with said second reaction zone for dispersing said ozone-containing gas in a suspension of said oil layer in said fresh liquid medium in said second reaction zone, at least one conduit communicating with said second reaction zone for removing gases and vapors from said second reaction zone, separation means for separating unreacted portions of said oil layer, oxidized products of said oil layer and said liquid medium, at least one conduit communicating with said second reaction zone and said separation means for conducting said unreacted portions of said oil layer, oxidized products of said oil layer and said liquid medium from said second reaction zone to said separation means.

6. A process for separating saturated hydrocarbons from a petroleum wax and lubricating oil distillate fraction which comprises suspending liquid droplets of said fraction in a carboxylic acid comprising liquid medium which selectively dissolves partally oxidized hydrocarbons in a reaction zone, dispersing ozone-containing gas into the resulting suspension, maintaining said suspension at a temperature in the range of 70° to 150° F. to effect partial oxidation of components of said fraction more easily oxidized than said saturated hydrocarbons thereby forming oxidation products which dissolve in said medium leaving unreacted saturated hydrocarbons suspended therein, and separating said medium and said oxidation products dissolved therein from said unreacted saturated hydrocarbons by removing said oxidation products dissolved in said medium from said reaction zone as said oxidation products are formed, and introducing additional amounts of said medium to said reaction zone to replace the amount of same removed with said oxidation products, said medium being more volatile than said oxidation products and substantially unreactive with said fraction and said oxidation products.

References Cited in the file of this patent

UNITED STATES PATENTS

| | | |
|---|---|---|
| 1,430,538 | Culmer | Oct. 3, 1922 |
| 1,836,325 | James | Dec. 15, 1931 |
| 1,916,923 | Forrest et al. | July 4, 1933 |
| 2,673,217 | Hull | Mar. 23, 1954 |
| 2,725,396 | Winkler | Nov. 29, 1955 |
| 2,750,411 | Fisher et al. | June 12, 1956 |
| 2,819,279 | Brown, et al. | Jan. 7, 1958 |

OTHER REFERENCES

Long: Chemical Reviews, vol. 27, pp. 437, 450, 451, 455 and 456 (1940).